Aug. 19, 1930.  L. P. BARLOW  1,773,337
MAP HOLDER
Filed May 22, 1926  2 Sheets-Sheet 1
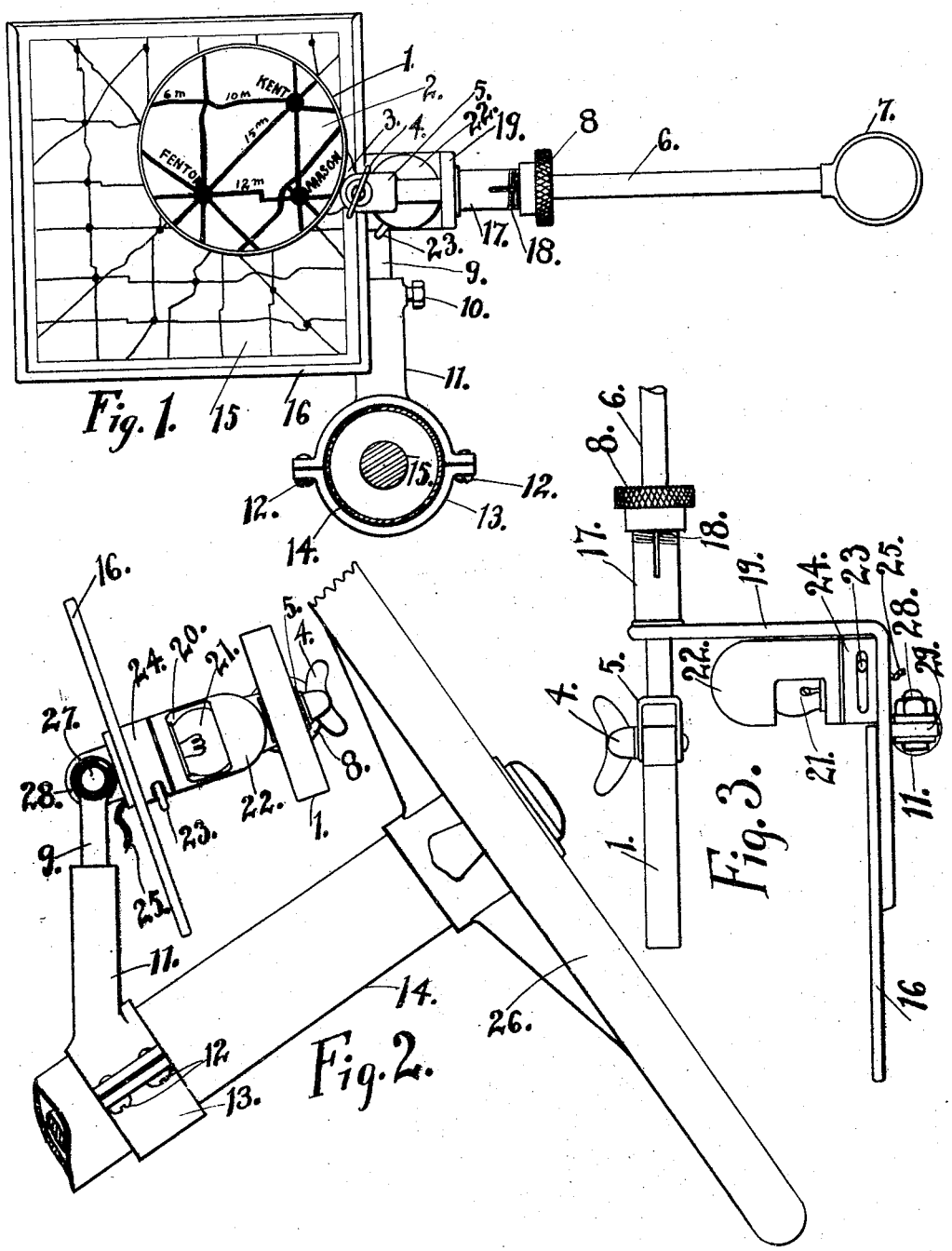

Aug. 19, 1930.  L. P. BARLOW  1,773,337
MAP HOLDER
Filed May 22, 1926  2 Sheets-Sheet 2
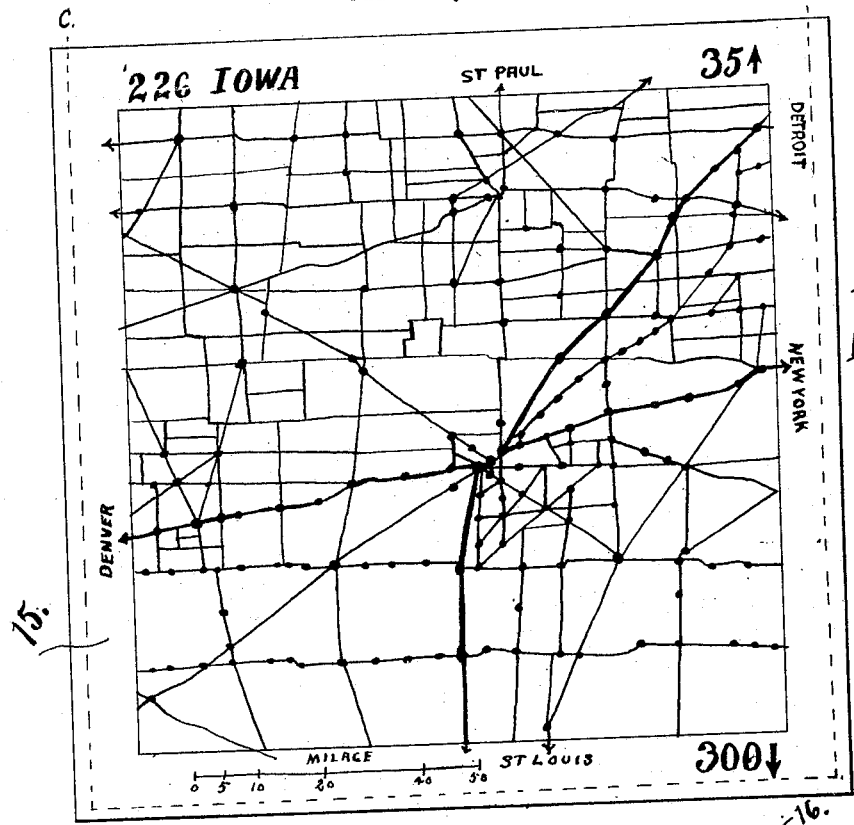
Fig.4.
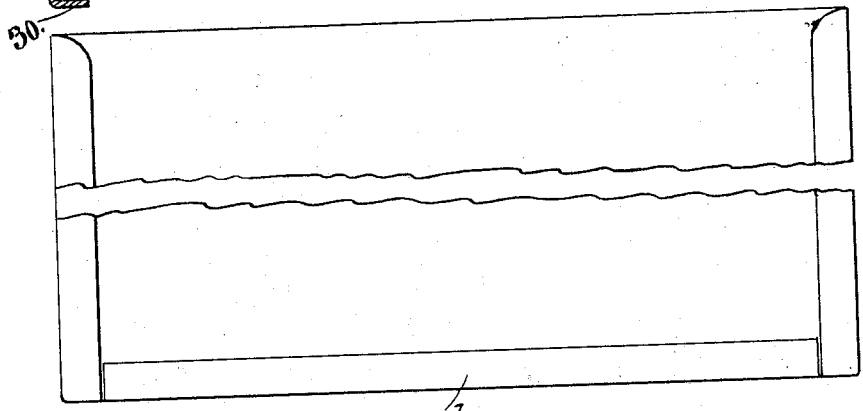
Fig.5.
Fig.6.
INVENTOR
Lester P. Barlow
BY
*signature*
ATTORNEY Patented Aug. 19, 1930

1,773,337

UNITED STATES PATENT OFFICE

LESTER P. BARLOW, OF STAMFORD, CONNECTICUT

MAP HOLDER

Application filed May 22, 1926. Serial No. 111,072.

This invention relates to improvements in map holders for use particularly in holding highway maps in the proper position for coordinating map studying and safe driving of a motor vehicle.

It is obvious that a motor vehicle operator's attention to his driving should not be interfered with if the maxim of safety is to be considered. One of my important objects is to provide a simple means for motor vehicle operators to consult the road maps without endangering themselves or others while their vehicle is in motion.

Another object of my invention is to provide a means for efficiently directing operators of military motor vehicles while their vehicles are traveling rapidly through battle areas night and day.

Another object is to supply a means for highly magnifying road maps so that they may be quickly and plainly read from the seat of the operator.

Another object is to permit the operator to adjust the magnifying glass to any position on the map and still permit at all times, full control of his vehicle even when the vehicle is traveling at high speed.

A further object is to permit the maps to be changed quickly and easily and to be taken from or returned to a suitable filing container.

An additional object is to permit maps of small character and proportions to represent a large area of territory, but still be plainly and quickly read.

Another object of my invention is to illuminate the road maps at night so that they may be distinctly seen at all desired times.

Another object is to permit tilting of the map surface to the desired angle and rigidly fixing map holder in that position.

Another object is to provide a plurality of maps, each covering a portion of a given territory—such as the United States—and each so marked as to enable the user to quickly determine the identity of the next map to be placed in the holder after the one he has been using becomes of no concern to him because of his passing beyond its range.

With the above and other objects in view, my invention consists in the arrangement, combination and construction of the various parts of my improved device as described in the specification, claimed in my claims, and shown in the accompanying drawings, in which:

Fig. 1 is a sectional view of an automobile steering post, showing in plan, my improved device attached thereto.

Fig. 2 is a side elevation of an automobile steering post and wheel with my improved device attached to the box.

Fig. 3 is a top or plan view of my improved device.

Fig. 4 is a plan view of a map utilized in my improved device.

Fig. 5 is a sectional view of the map holder utilized with my improved device.

Fig. 6 is an elevation of the map holder utilized with my improved device.

I have shown a circular metallic rim 1 enclosing a magnifying glass 2 and pivotally held through the bracket 3 to the clevis 5 on one end of the rod 6 and adapted to extend substantially opposite the rim of the wheel 26 on the end of the steering column 14 so that the operator may engage a finger in the ring 7 and adjust the rod 6 longitudinally so as to bring the magnifying glass 2 over different portions of the map 15. A split sleeve 17 is provided around the rod 6, having screw threads 18 thereon to receive a nut 8. By screwing the nut 8 on the threads of the split sleeve 17 enough friction can be brought to bear on the rod 6 to prevent its dislocation by the jars incident to driving a vehicle to which the device is attached.

A bracket 11, having one end formed in a half circle to embrace the steering post 14, is secured to the steering post being a corresponding half circle 13 and studs 12. A rod 9 is inserted in the other end of the bracket 11. A set screw 10 is provided in the shank of the bracket 11 for adjusting the position of the rod 9 therein. The free end of the rod 9 is flattened and apertured to receive a bolt 27 having a nut 28 thereon. Also secured to the bolt 27 is an angle bracket 19 having the projection 29 thereon which engages the bolt and pivotally secures the bracket 19 in any desired position.

Secured on one face of the bracket 19 is a conventional electric light socket 24 having a conventional switch handle 23, bulb 21 and conventional cover 22. The bulb 21 is adapted to be lighted by connecting the wire 25 with a suitable source of electric energy such as the storage battery of the motor vehicle. Directly under the bulb 21 is mounted the map frame 16 in which the flat map 15 is adapted to be held by the bent-over corners 30 of the holder.

It will be apparent that maps utilized in this manner can not satisfactorily be larger than eight inches square, and in order to cover a large territory with as small indicia as is possible, the magnifying glass 3 is utilized. It will be apparent that the maps can be removed from the map holder with facility, and in the event several maps covering a prescribed territory are used, I provide indicia at the different edges of each map which will point out to the person using the maps the number of the next succeeding map which he will desire after having reached the edge of the map which is then being used. For instance, in the event that the user were en route to St. Louis and came to the end of the road to St. Louis as shown on the map in Fig. 4, it would be necessary that he use another map which would be map No. 300, in order to continue on the road to St. Louis.

The adjustable features of the bracket will permit adjustment of the map to any angle desired relative to the steering wheel, and will make possible the bringing of the map substantially in the line of vision of the driver, with the road. The magnifying glass 3 can be adjusted to cover all sections of the map through the rod 6 and the pivot around the wing nut 4. The device may be used with facility at night, by reason of the provision of the lamp 21 shedding its light directly over the face of the map 15.

In order to secure the greatest amount of territory on the prescribed map area, I have found an indicia size which is so small that it cannot be satisfactorily read during the movement of the vehicle at a distance of two feet from the eye of the operator without the aid of a magnifying glass. It will be apparent that the device as described will serve many useful purposes as set forth in the objects of my invention.

It is obvious that various changes may be made in the arrangement, combination and construction of the various parts of my improved device without departing from the spirit of my invention, and it is my intention to cover by my claims such changes as may be reasonably included within the scope thereof.

What I claim is:

1. In combination with a supporting surface of a motor vehicle, a bracket secured to said surface, a map holding element supported by said bracket, a slidably adjustable member supported by said bracket, and a magnifying glass adjustably supported by said member in overlying relationship in respect to said element, said magnifying glass being pivoted on said member to swing in a plane parallel to the length thereof and parallel to the map holding surface of said element.

2. In combination with a supporting surface of a motor vehicle, a bracket carried by said surface, a map holding element supported by said bracket in proximity to the steering wheel of said vehicle, a longitudinally extending member slidably supported by said bracket for movement in a plane above and parallel to the map holding surface of said element, and a magnifying glass pivotally supported by said member to swing in a plane parallel to the map holding surface of said element.

3. In combination with the steering post and steering wheel of a motor vehicle, a bracket assembly carried by said post, a map holding element carried by said assembly below said wheel, a slidably adjustable member carried by said assembly between said element and said wheel, and a magnifying glass carried by one end of said member and overlying said element, the opposite end of said member being provided with manually engageable means positioned adjacent the periphery of said wheel for adjusting the position of said glass relative to said element.

4. In combination with an angularly disposed steering post of a motor vehicle, a bracket secured thereto, a vertically adjustable supporting post carried by said bracket, a map holding element carried by said supporting post, and a magnifying glass supported from said supporting post and manually movable over the surface of said map holding element.

5. In combination with an angularly disposed steering post of a motor vehicle, a bracket secured thereto, a generally vertically adjustable supporting post carried by said bracket, a map holding element pivotally carried by said supporting post for swinging movement about a horizontal line, and magnifying glass supported by said supporting post for adjustable movement over the map holding surface of said element and pivotally movable with said element.

6. In combination with the steering post of a motor vehicle, a bracket assembly secured thereto, a map holding element carried by said assembly, a rod slidably carried by said assembly above said element, and a magnifying glass carried by an end of said rod and movable over the map holding surface thereof, said rod being slidable through a split sleeve provided with a nut for frictionally clamping said rod in said sleeve.

LESTER P. BARLOW.